United States Patent
Han

(10) Patent No.: US 8,024,567 B2
(45) Date of Patent: Sep. 20, 2011

(54) INSTANT LOG-IN METHOD FOR AUTHENTIFICATING A USER AND SETTLING BILLS BY USING TWO DIFFERENT COMMUNICATION CHANNELS AND A SYSTEM THEREOF

(75) Inventor: Min-Gyu Han, Seoul (KR)

(73) Assignee: Momocash Inc., Seoul (KR)

( * ) Notice: Subject to any disclaimer, the term of this patent is extended or adjusted under 35 U.S.C. 154(b) by 124 days.

(21) Appl. No.: 10/508,705

(22) PCT Filed: Mar. 31, 2003

(86) PCT No.: PCT/KR03/00629
§ 371 (c)(1),
(2), (4) Date: Sep. 30, 2004

(87) PCT Pub. No.: WO03/084127
PCT Pub. Date: Oct. 9, 2003

(65) Prior Publication Data
US 2006/0179304 A1    Aug. 10, 2006

(30) Foreign Application Priority Data

Mar. 30, 2002  (KR) .................. 10-2002-0017577
Nov. 18, 2002  (KR) .................. 10-2002-0071762

(51) Int. Cl.
H04L 9/32    (2006.01)
H04L 9/30    (2006.01)

(52) U.S. Cl. ........ 713/168; 713/155; 713/169; 713/170; 713/171; 713/172; 380/229; 380/247; 705/64; 705/67; 705/72; 705/74; 705/75; 705/79; 455/466; 455/410; 455/39; 455/411; 455/407

(58) Field of Classification Search ................... None
See application file for complete search history.

(56) References Cited

U.S. PATENT DOCUMENTS
5,986,565 A    11/1999    Isaka
(Continued)

FOREIGN PATENT DOCUMENTS
JP    2001-266036    9/2001
(Continued)

OTHER PUBLICATIONS
Official Action in corresponding European Patent Application EP 03713055.6, dated Dec. 16, 2009.

*Primary Examiner* — Syed A. Zia
(74) *Attorney, Agent, or Firm* — Lowe Hauptman Ham & Berner LLP

(57) ABSTRACT

A method for authenticating a user of certain service provided by a system through a first communication channel, in one aspect including receiving an access request from a first terminal of the user through the first communication channel; receiving an address or number of a second terminal of the user through the first communication channel; transferring data including an identification code, to the second terminal of the user through a second communication channel; receiving a user confirmation response, including the user identification code, from the second terminal of the user through the second communication channel; determining whether the identification code transferred to the second terminal is identical to the user identification code received from the second terminal; generating an authentication code if it is determined that both the user identification codes are identical to each other; transferring the user authentication code to the first terminal of the user through the first communication channel.

4 Claims, 12 Drawing Sheets

U.S. PATENT DOCUMENTS

| | | | | |
|---|---|---|---|---|
| 6,898,421 B2* | 5/2005 | Mori et al. | | 455/411 |
| 6,993,323 B2* | 1/2006 | Kamma | | 455/411 |
| 7,337,229 B2* | 2/2008 | Dutta et al. | | 709/229 |
| 7,756,476 B2* | 7/2010 | Suzuki | | 455/41.2 |
| 7,769,687 B2* | 8/2010 | Gebb et al. | | 705/39 |
| 7,865,937 B1* | 1/2011 | White et al. | | 726/2 |
| 2002/0029169 A1* | 3/2002 | Oki et al. | | 705/26 |
| 2002/0031225 A1* | 3/2002 | Hines | | 380/247 |
| 2002/0095589 A1* | 7/2002 | Keech | | 713/189 |
| 2002/0143634 A1* | 10/2002 | Kumar et al. | | 705/18 |
| 2002/0169988 A1* | 11/2002 | Vandergeest et al. | | 713/201 |
| 2002/0186688 A1* | 12/2002 | Inoue et al. | | 370/352 |
| 2003/0028639 A1* | 2/2003 | Yamamoto et al. | | 709/225 |
| 2003/0061503 A1* | 3/2003 | Katz et al. | | 713/200 |
| 2006/0179304 A1* | 8/2006 | Han | | 713/168 |
| 2007/0158414 A1* | 7/2007 | Sasakura et al. | | 235/380 |
| 2011/0014870 A1* | 1/2011 | Koraichi et al. | | 455/41.2 |

FOREIGN PATENT DOCUMENTS

| | | |
|---|---|---|
| JP | 2002-007345 | 1/2002 |
| KR | 2001-0028964 | 8/1999 |
| KR | 2001-0016153 A | 3/2001 |
| KR | 2001-0022354 | 4/2001 |
| KR | 2001-0028964 A | 4/2001 |
| KR | 2001-0068124 A | 7/2001 |
| KR | 2001-0068124 A | 7/2001 |
| KR | 100392792 | 7/2003 |
| WO | WO 01/15381 A1 | 3/2001 |
| WO | WO 01/54438 A1 | 7/2001 |
| WO | WO 01/92999 A2 | 12/2001 |

\* cited by examiner

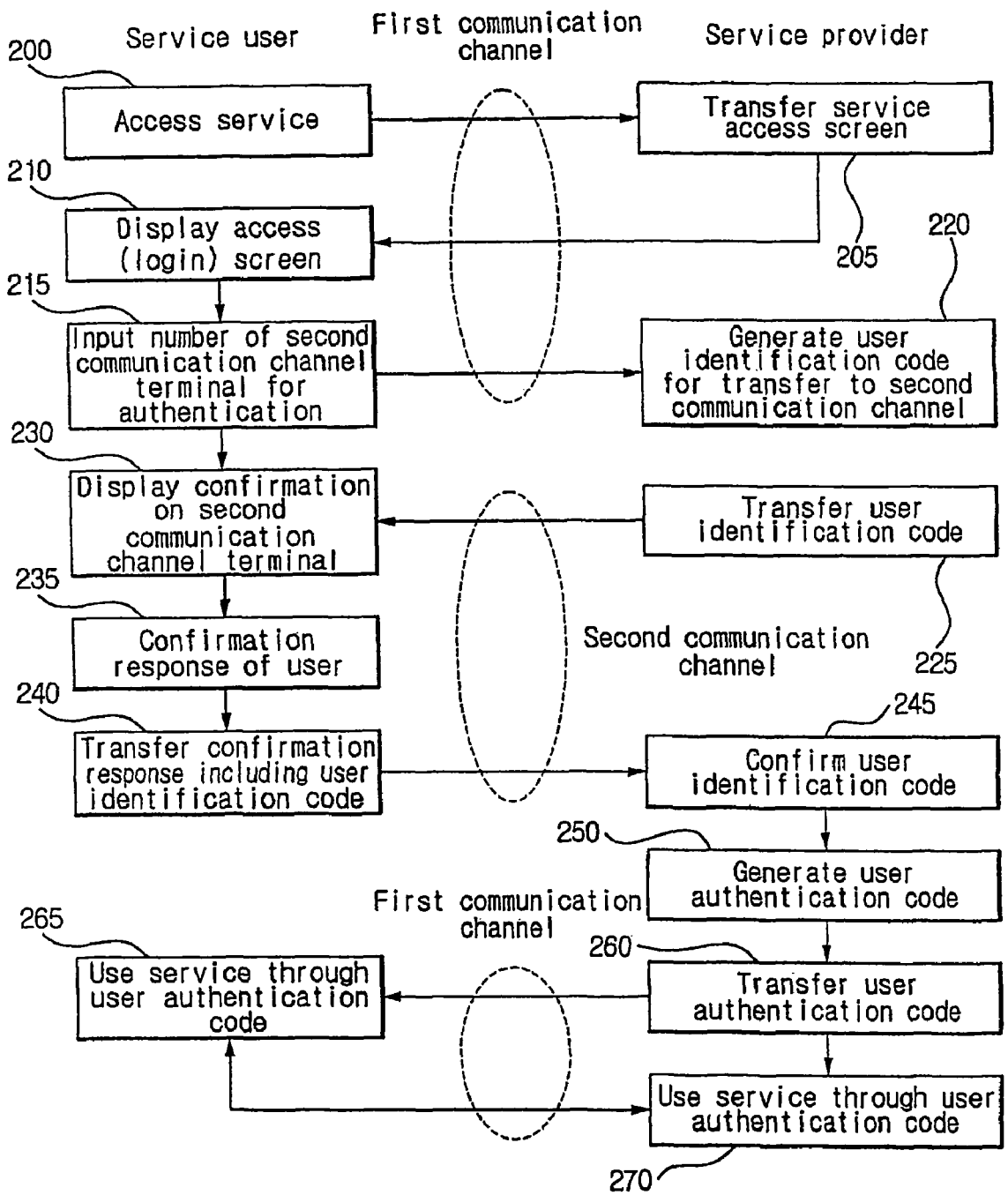

US 8,024,567 B2

INSTANT LOG-IN METHOD FOR AUTHENTIFICATING A USER AND SETTLING BILLS BY USING TWO DIFFERENT COMMUNICATION CHANNELS AND A SYSTEM THEREOF

TECHNICAL FIELD

The present invention relates to a method and system for authenticating a user who wants to use a certain service and settling bills for use of the service at a web site on the Internet, and more particularly to a method and system for authenticating a user who wants to use a certain service and settling bills for use of the service at a web site accessed through the Internet wherein only minimal basic information on the user is received by a first communication channel, such as an Internet, with a relatively weak security and a process of user identification and bill settlement is performed by a second communication channel, such as a wired or wireless telephone network, with a relatively strong security, such that only an authenticated user can use the certain service.

BACKGROUND ART

As well known to those skilled in the art, user authentication is an essential procedure for use in a certain information service or a certain on-line service. Such user authentication is typically performed through a user information registration step and a user identification step, and thus, only an authenticated user can use a certain service provided by a service provider. In such a conventional user authentication process, it is essentially required to input a user ID and a user password for access to a web site along with personal information on the user who wants to use the certain service.

FIG. 1 shows a flowchart for explaining a user authentication process using such a user ID and password and a bill settlement process for use of a certain service in the prior art. The user goes through a user information registration process when accessing a desired web site, and then, the user goes through a user authentication step whenever he/she uses a certain service. Referring to FIG. 1, the conventional user authentication process is mainly classified into two steps: i.e., a user information input step of inputting basic information on the user (information required by a service provider, including name, address, social security number, contact number, kinds of user's favorite contents, etc.), as shown in FIG. 1A; and a user authentication step of authenticating the user by checking a user ID and a user password, which are assigned by the user, as shown in FIG. 1B.

However, there is a problem in that the conventional user authentication process shown in FIGS. 1A and 1B has no step for identifying a user. That is, in a case where a person under age performs the user information registration step by using an illegal social security number generation application, it cannot be checked in real time. Moreover, it is difficult to monitor the illegal registration of the person under age even after the fact, if a great number of members are initiated.

In addition, in order to obtain access to desired information at a great number of web sites from which a variety of services are provided, there exists inconvenience in that a user has to input the same personal information (name, address, social security number, contact number, etc.) every web site. Further, there exists a problem in that a number of users often abandon the registration of personal information related to a bill settlement process due to a possibility of outflow of the personal information when they input the information into a web site from which information is provided at a predetermined cost. Furthermore, even in a case where there is no reliable relationship between a user and a web site, the user is reluctant to input the personal information into the web site.

In addition, there is a problem in that users with user accounts in a plurality of web sites frequently confuses or forgets their own IDs and passwords registered on the plurality of web sites.

In order to solve one of the problems in the prior art in that there is no user identification step, several web sites receives a photocopy of user identification card via facsimile from a user who has completed the user registration step to identify the relevant user. However, it also raises another problem in that an advantage of the Internet, that is, a quick access to information, cannot be sufficiently used.

In addition, in order to solve a weak security corresponding to another problem in the prior art, there has been proposed a user authentication method using a mobile communication network. Korean Patent Laid-Open Publication No. 2000-72433 discloses a user authentication method in which, when a user who wants to access a security-required system requests user authentication to an authentication system, the authentication system transmits a one-time password to a mobile communication terminal of the user, and the user confirms this password through a screen of the mobile communication terminal and manually inputs the confirmed password through a computer for access to the desired system. However, although this method is a technique that is improved in view of security over other conventional user authentication methods, there still exists inconvenience in that the user must directly confirm the transmitted one-time password through the screen of the mobile communication terminal and then manually input the password again.

In addition, in order to solve the problem of the prior art in that the user registration step has to be performed every web site to use a variety of services provided by a number of web sites, there has been proposed a method in which a user can be commonly authenticated from a plurality of web sites through one user ID and one password by sharing user information among the plurality of web sites. However, this method cannot be used widely due to conflict of interest between web site administrators and high risk of outflow of personal information against user's will.

In addition, the prior art has a further problem in that, when a bill settlement is required for certain pay contents, a user must move to a settlement page for each individual service and then input certain settlement information (name, social security number, password, etc.) again.

FIG. 1C shows a conventional bill settlement method for a used service. If a user selects pay contents and wants to settle a bill for reading of the contents by means of a mobile phone, he/she moves a new web page for inputting information (telephone number, social security number, etc.) required for settlement. Then, a certain SMS message including an authentication code is received and confirmed by the mobile phone identified by an input telephone number. Then, the confirmed authentication code is input into the web page for completing the settlement. As mentioned above, such mobile phone settlement method shown in FIG. 1C has a complicated settlement process in that the user must move a corresponding settlement web page every use of pay contents, input settlement information for each settlement, and further input an authentication code confirmed on a screen of the mobile phone into the settlement web page.

Korean Utility Model Registration No. 20-0193499 discloses a system for settling a certain amount of money by using a mobile phone or a wired telephone. A settlement process performed in the settlement system is as follows. A user who wants to receive a service accesses a carrier server through a communication network by using a first his/her own terminal. An access management and authentication confirmation apparatus of the carrier server requests the user to input a telephone number and a password of a second terminal through which he/she can be called. The user inputs the telephone number of the second terminal through which he/she receives a call and the password by which he/she can be identified as a right user, upon a request of the carrier server. The access management and authentication confirmation apparatus that has received the telephone number and the password stores the password in a database and instructs a telephone call apparatus to call the second terminal. The telephone call apparatus calls the second terminal having the telephone number received by the instruction of the access management and authentication confirmation apparatus. The access management and authentication confirmation apparatus sends a message requesting to input the password to the user when the apparatus is connected to the user. The user called through the second terminal having the known telephone number again inputs the password input at the initial access by using the called second terminal. The access management and authentication confirmation apparatus again received the password compares the again received password with the already input password for user identification, grants the user an authority to use the service when both passwords are identical to each other and causes a service providing apparatus to provide the service, and finally imposes a fee for service use on the telephone number owned by the user when the service use is ended.

However, the disclosure of the Korean Utility model does not suggest a solution for the problem of the conventional settlement method that the settlement information has to be again input every settlement and the already input password has to be again input through the mobile phone.

DISCLOSURE OF THE INVENTION

Accordingly, the present invention has been made keeping in mind the above problems occurring in the prior art, and an object of the present invention is to provide a user authentication method and system which is capable of removing a need of a user registration step by using one user ID, which is an address or an number (wired telephone, mobile communication terminal number, etc.) of a user terminal of a second communication channel such as a wired telephone network or a wireless network in a variety of web sites, for user authentication.

Another object of the present invention is to provide a user authentication method and system which is capable of removing a risk of losing a user ID or password by using a user terminal address or number of a second communication channel.

Still another object of the present invention is to provide a user authentication method and system that is capable of performing a user identification and authentication without requiring a separate step when the user requests an authentication.

Still another object of the present invention is to provide a user authentication method and system with a stronger security compared to a conventional user authentication.

Still another object of the present invention is to provide a settlement method and system that is capable of maximizing a user convenience upon settling bills by removing a re-input of settlement information when the user uses pay contents.

In order to achieve the objects and solve the problems in the prior art, a method for authenticating a user according to a embodiment of the present invention comprising the steps of receiving an access request from a first terminal of the user through the first communication channel; receiving an address or number of a second terminal of the user through the first communication channel; transferring data for user identification, including a user identification code, to the second terminal of the user through a second communication channel; receiving a user confirmation response, including the user identification code, from the second terminal of the user through the second communication channel; determining whether the user identification code transferred to the second terminal is identical to the user identification code received from the second terminal; generating a user authentication code if it is determined that both the user identification codes are identical to each other; and transferring the user authentication code to the first terminal of the user through the first communication channel.

Further, in order to achieve the objects and solve the problems in the prior art, a method for authenticating a user according to another embodiment of the present invention comprising the steps of receiving an access request from a first terminal of the user through the first communication channel; receiving an address or number of a second terminal of the user through the first communication channel; generating a user identification code; transferring the generated user identification code to the first terminal of the user through the first communication channel; receiving the user identification code transferred to the first terminal of the user from the second terminal of the user through a second communication channel; determining whether the user identification code transferred to the first terminal is identical to the received user identification code; generating a user authentication code if it is determined that both the user identification codes are identical to each other; and transferring the user authentication code to the first terminal of the user through the first communication channel.

BRIEF DESCRIPTION OF DRAWINGS

FIG. 2 is a flowchart showing an embodiment of an instant login user authentication by using the two different communication channels according to the present invention.

BEST MODE FOR CARRYING OUT THE INVENTION

Hereinafter, the present invention will be in detail described by ways of preferred embodiments with reference to the accompany drawings.

FIG. 2 is a flowchart for explaining a user authentication process by means of two different communication channels according to the present invention. The user authentication process is performed between a user and a service provider. The user accesses a system of the service provider through a first communication channel such as an Internet (step 200). The service provider transfers a service access screen to a user computer upon a request of access from the user (URL input of a user system, a request of information requiring a user authentication, etc.) (step 205), and then displays the access (login) screen at a web browser of the user (step 210). The user inputs a terminal number (a wired telephone number or a mobile communication terminal telephone number) of a second communication channel such as a wired telephone network or a wireless network for user authentication into a corresponding section of the login screen for transferring the terminal number to the service provider (step 215). Then, the service provider generates a user identification code for the user (step 220). The service provider transfers the generated user identification code to the second terminal of the user such as the wired telephone or the portable telephone through the second communication channel such as the wires or wireless networks (step 225) for display of a certain message (for example, "Push the confirmation button if you want to log in") on a screen of the second terminal occupied by the user (step 230). The user who has received the user identification code transfers a user confirmation response including the user identification code to the service provider for the identification request of the service provider (steps 235 and 240). The service provider confirms the user identification code included in the user confirmation response (step 245), compares the user identification code transferred from the user with the user identification code transferred from the service provider to the user, determines the user as a lawful user when both user identification codes are identical to each other and accordingly generates a user authentication code (step 250). The generated user authentication code is transferred to the first terminal of the user through the first communication channel such as the Internet (step 260) and the user can use the service while giving/taking the user authentication code to/from the service provider (steps 265 and 270).

Figure 1A:
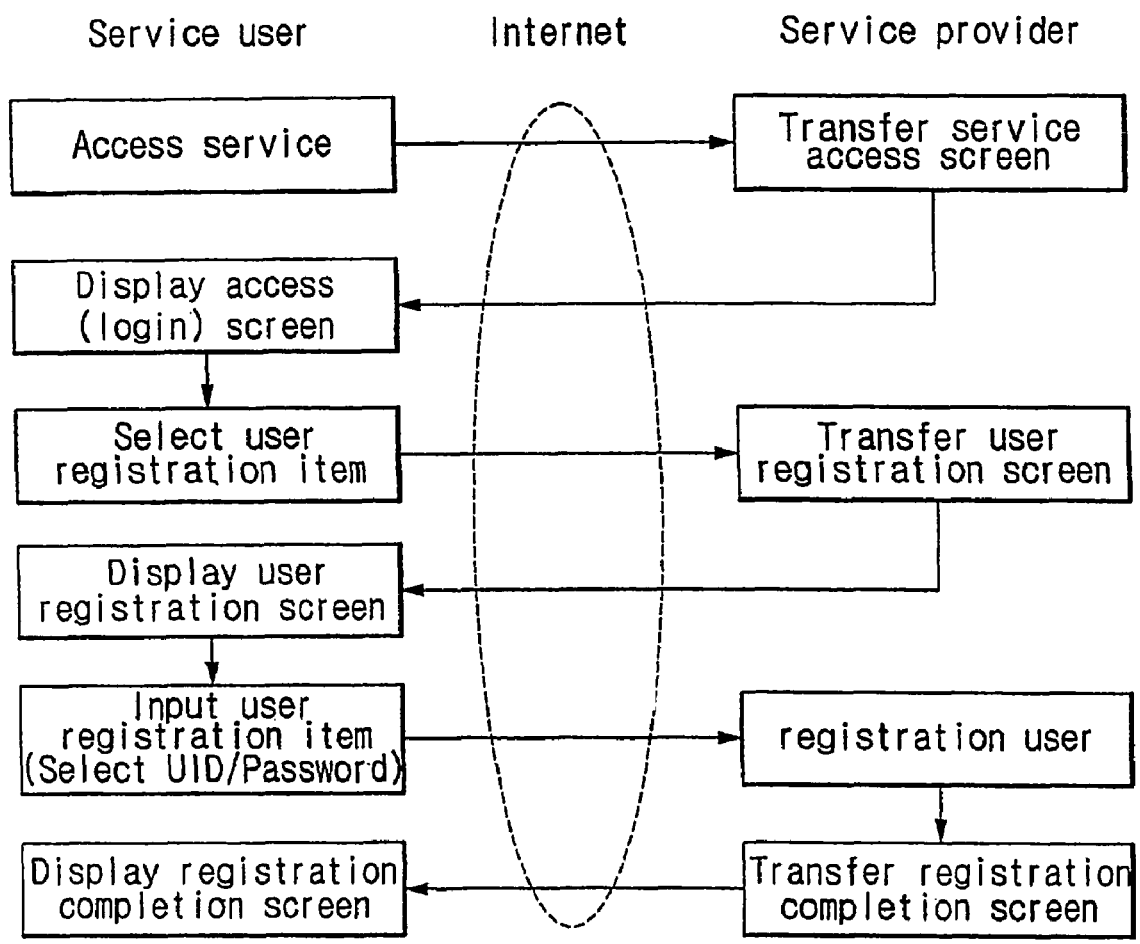
FIG. 1 is a flowchart showing a conventional user information registration process using a user ID and password, a user authentication process and a bill settlement process for a used service.
Figure 1B:
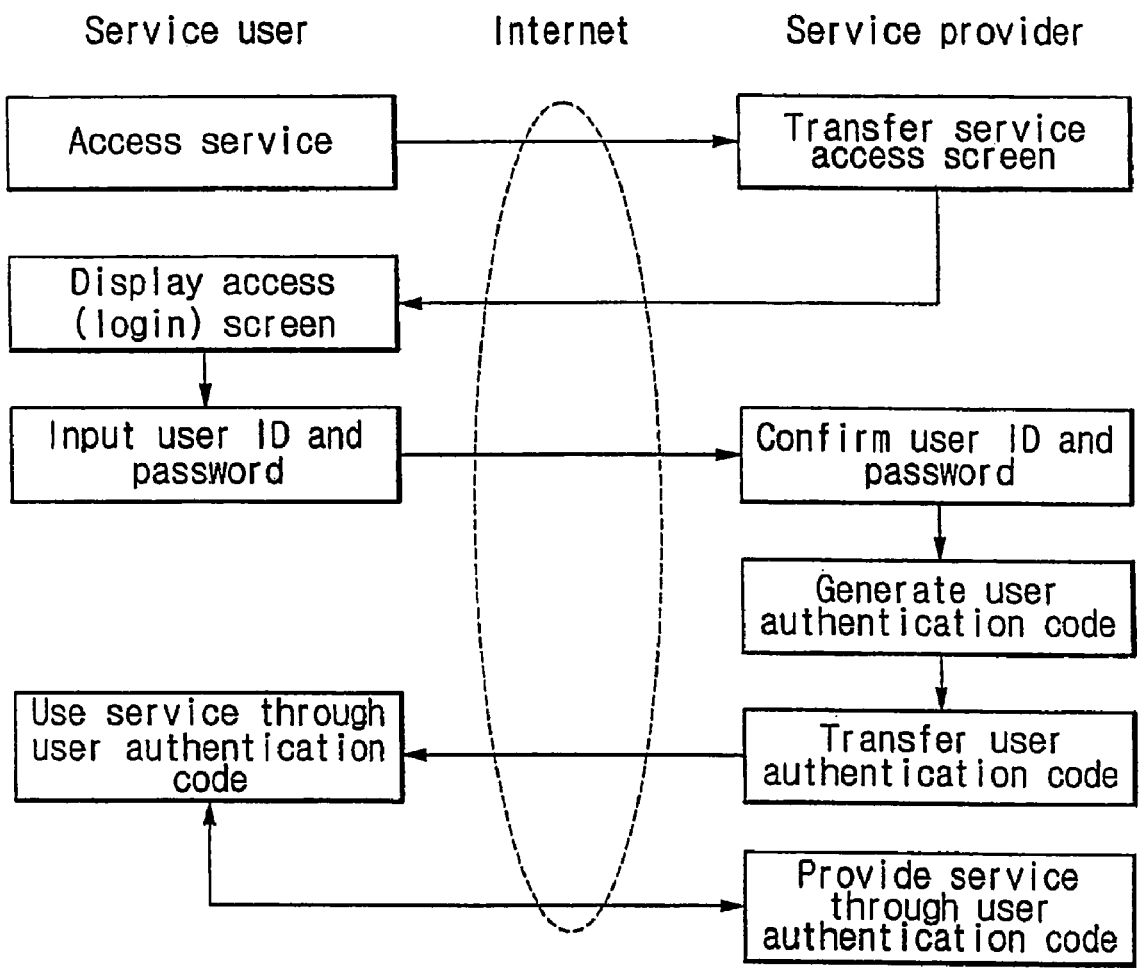
Figure 1C:
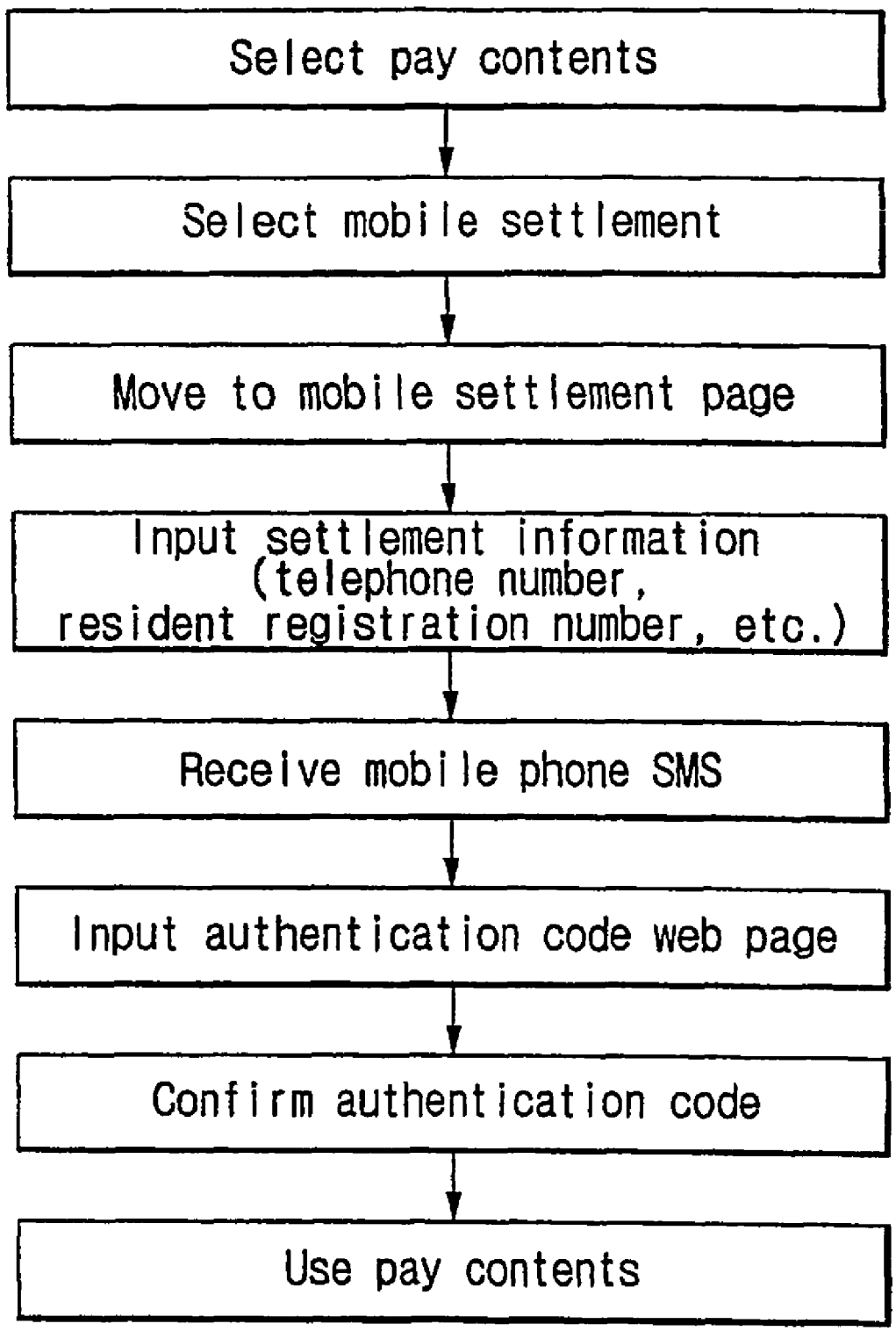
Figure 3:
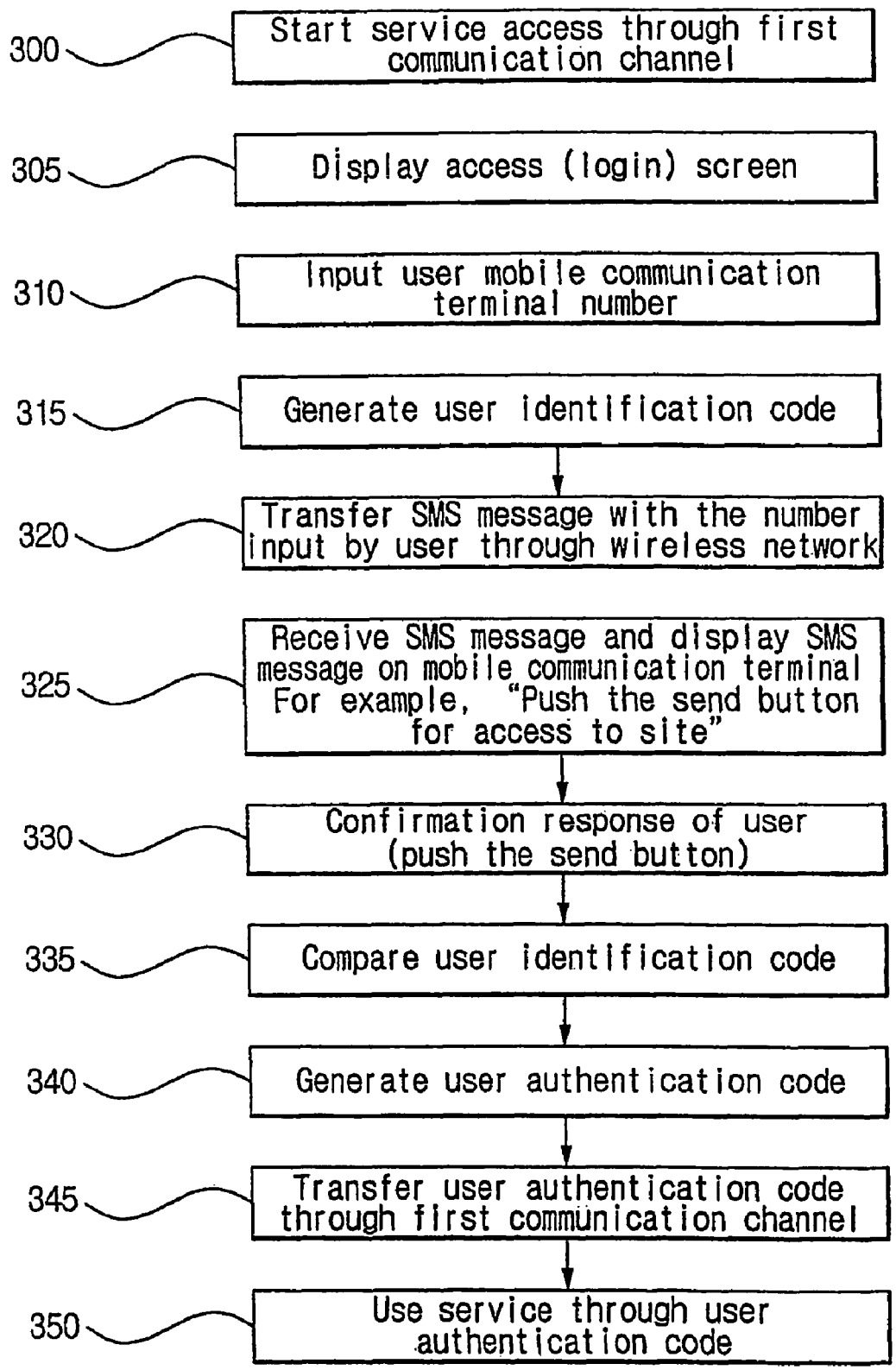
FIG. 3 is a flowchart showing an embodiment in a case that the second communication channel is a wireless network in the instant login user authentication by using the two different communication channels according to the present invention.

FIG. 3 is a flowchart for explaining an embodiment if the second communication channel is a wireless network in the user authentication method described in FIG. 2. The user accesses a system of the service provider through a first communication channel such as an Internet (step 300). The service provider transfers a service access screen to a first terminal of the user such as a computer upon a request of access from the user and then displays the access (login) screen at a web browser worked in the first terminal of the user (step 305). The user inputs his/her mobile communication terminal number for user authentication into a corresponding section of the login screen for transferring the terminal number to the service provider (step 310). Then, the service provider generates a user identification code for the user (step 315).

The service provider transfers the generated user identification code to the mobile communication terminal of the user (step 320). In this step, the service provider can transfer a message and the user identification code, which are to be displayed at the mobile communication terminal of the user, along with a predetermined callback number by using a short message service (SMS) system. In this case, in order to set a call as the mobile communication terminal number of the user input in the first communication channel, the service provider can use a CTI (Computer Telephone Integration) system that is a system for setting a call with the mobile communication terminal of the user through the wireless communication network by using the mobile communication terminal number of the user input in a computer (step 325). The user issues a user confirmation response, which can be performed by only pushing a send button, in compliance with the message (for example, "Push the send button if you want to access this site") displayed at his/her mobile communication terminal. The user identification code transferred to the mobile communication terminal of the user along with the user confirmation response is transferred to the service provider through the callback number (step 330).

According to another preferred embodiment of the present invention, a URL callback system can be used when the service provider transfers the user identification code to the mobile communication terminal, as shown in FIG. 4.

As well known to those skilled in the art, the URL callback transfers a uniform resource locator (URL) of a mobile homepage ("phone page") and the user identification code inserted as a parameter for user identification into the mobile homepage, instead of the callback number in the aforementioned SMS, to the mobile communication terminal of the user (steps 420 and 425). When the user receives the URL and the user identification code and pushes a confirmation button on his/her mobile communication terminal, the mobile communication terminal of the user is connected directly to a phone page specified by the URL (step 430) and the user identification code set as the parameter is connected directly to a server of the phone page specified by URL for transfer (step 435). In the case of use of the SMS, transferable data capacity is limited to 80 bytes or so. Therefore, if a capacity of the user identification code generated in the service provider is relatively large, the URL callback system other than the SMS system is preferably used. Also in this embodiment, the user issues the user confirmation response, which can be performed by only pushing a send button, in compliance with the message (for example, "Push the send button if you want to access this site") displayed at his/her mobile communication terminal. The user identification code transferred to the mobile communication terminal of the user along with the user confirmation response is transferred to the service provider through the URL. In this case, a message for the user is displayed on a screen of the mobile communication terminal of the user, but the user identification code inserted into the callback URL may not be seen by the user.

In addition, the SMS message received for user identification can further include a prescribed identification symbol for allowing the user to discriminate a message along with a message notifying logging in the site. This identification symbol can be a numerical form used widely in the art, alternatively, a graphic image or a special character including an icon character in a preferred embodiment of the present invention.

The user received the SMS message confirms that the identification symbol displayed on a display of the terminal of the first communication channel is identical to that displayed on a display of the terminal of the second communication channel, and transfers the user confirmation response to the server specified in the callback URL for confirmation of his/her login intention by pushing the confirmation button of the terminal of the second communication channel if he/she agrees to login.

The service provider compares the user identification code included in the user confirmation response transferred from the user with the user identification code transferred from the service provider to the user, determines the user as a lawful user when both user identification codes are identical to each other (step 335) and accordingly generates a user authentication code (step 340). The generated user authentication code is transferred to the first terminal of the user such as a computer through the first communication channel such as the Internet (step 345) and the user can use the service while giving/taking the user authentication code to/from the service provider (step 350).

Figure 4A:
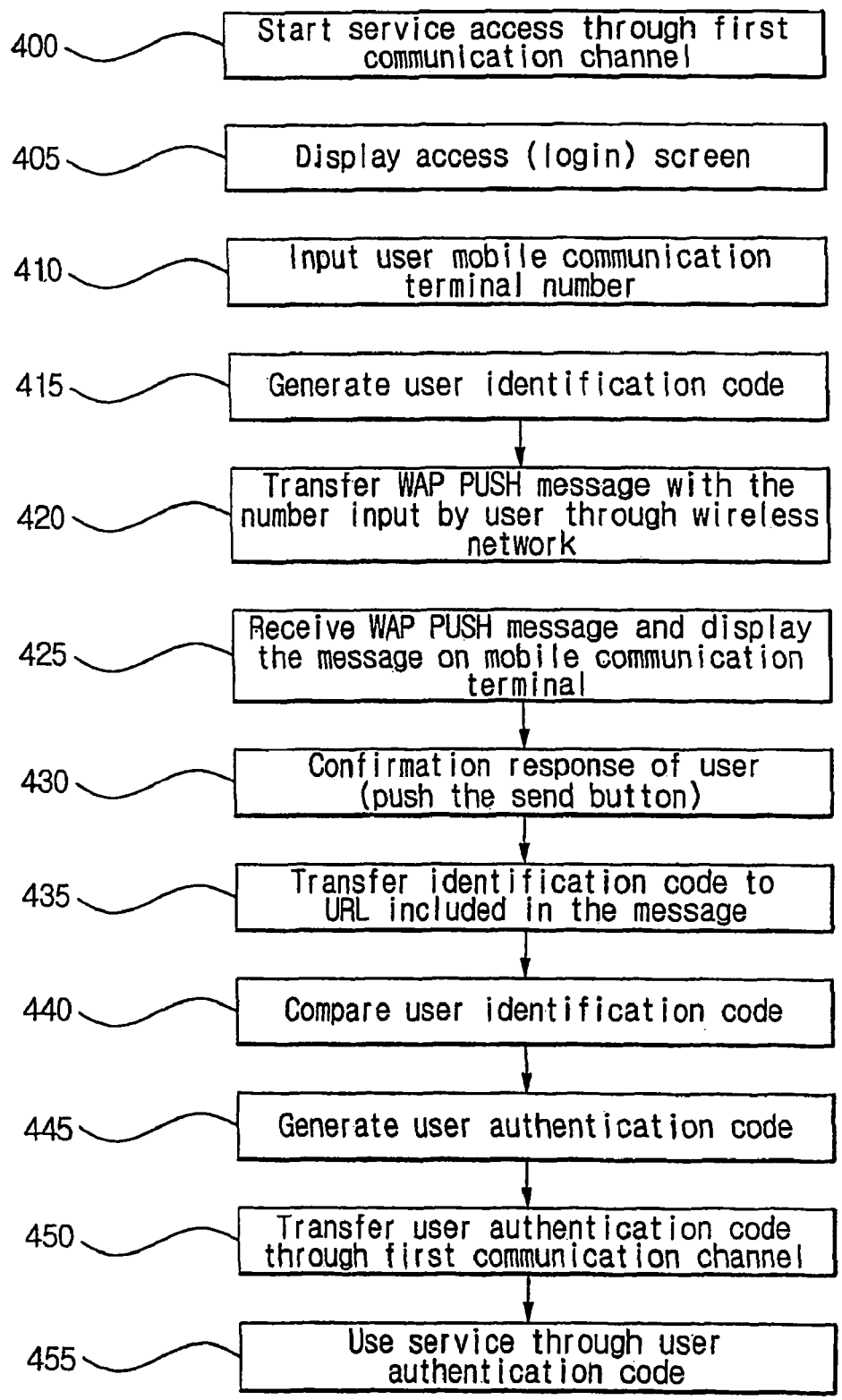
FIG. 4 is a flowchart showing another embodiment in a case that the second communication channel is a wireless network in the instant login user authentication by using the two different communication channels according to the present invention and a drawing showing a example of service performing the flowchart.

FIG. 4A is a flowchart for explaining a case that the user identification code transferred to the mobile communication terminal of the user is transferred in the URL callback system in an instant login user authentication process according to the preferred embodiment of the present invention shown in FIG. 3. A description of FIG. 4A is similar to that about FIG. 3. However, as described above, the callback number in the SMS message transfer as mentioned in the description of FIG. 3 is replaced with the URL callback system of FIG. 4A.

Figure 4B:
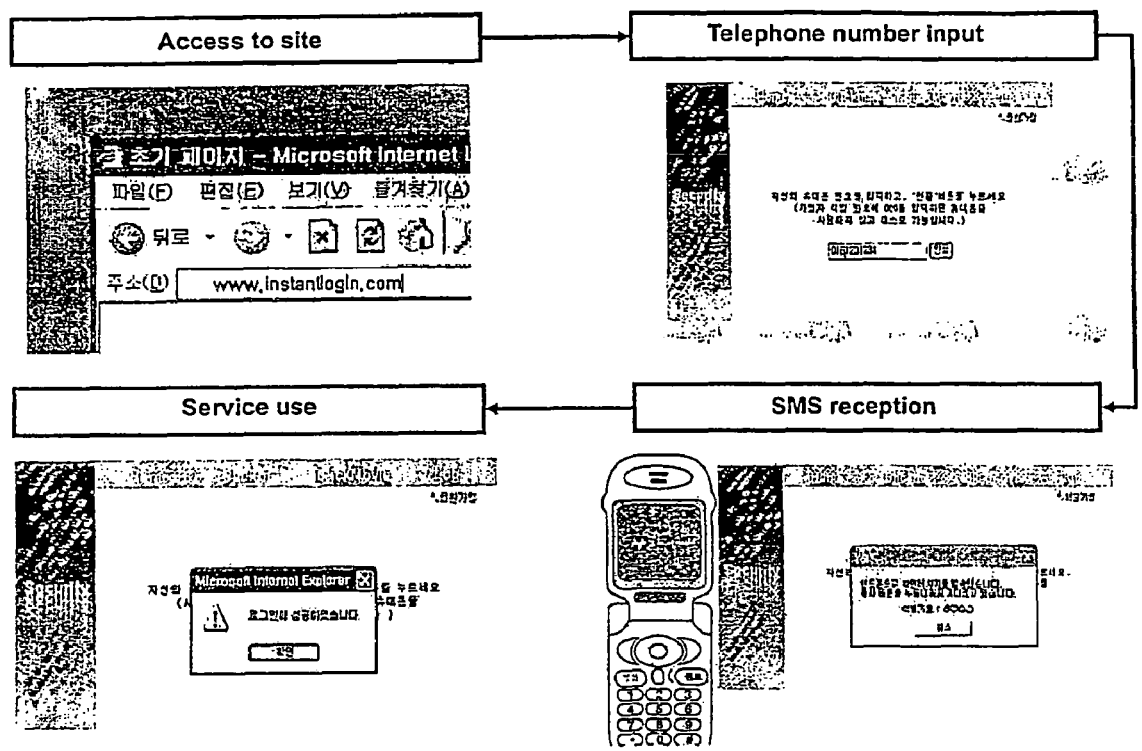

FIG. 4B is a view showing one example of the instant login user authentication process according to the preferred embodiment of the present invention described above with respect to FIG. 4A. Referring to FIG. 4B where an embodiment of the instant login user authentication process according to the preferred embodiment of the present invention is shown in detail, a user accesses a certain web page for inputting a telephone number of the terminal of the second communication channel of the user, and logins the web page by receiving and confirming the SMS message transferred to the terminal of the second communication channel. According to the preferred embodiment of the present invention, the SMS message transferred to the terminal of the second communication channel of the user can further include a prescribed identification symbol for allowing the user to discriminate a message along with a message notifying logging in the site. This identification symbol can be a numerical form used widely in the art, alternatively, a graphic image or a special character including an icon character, as mentioned above.

Figure 5:
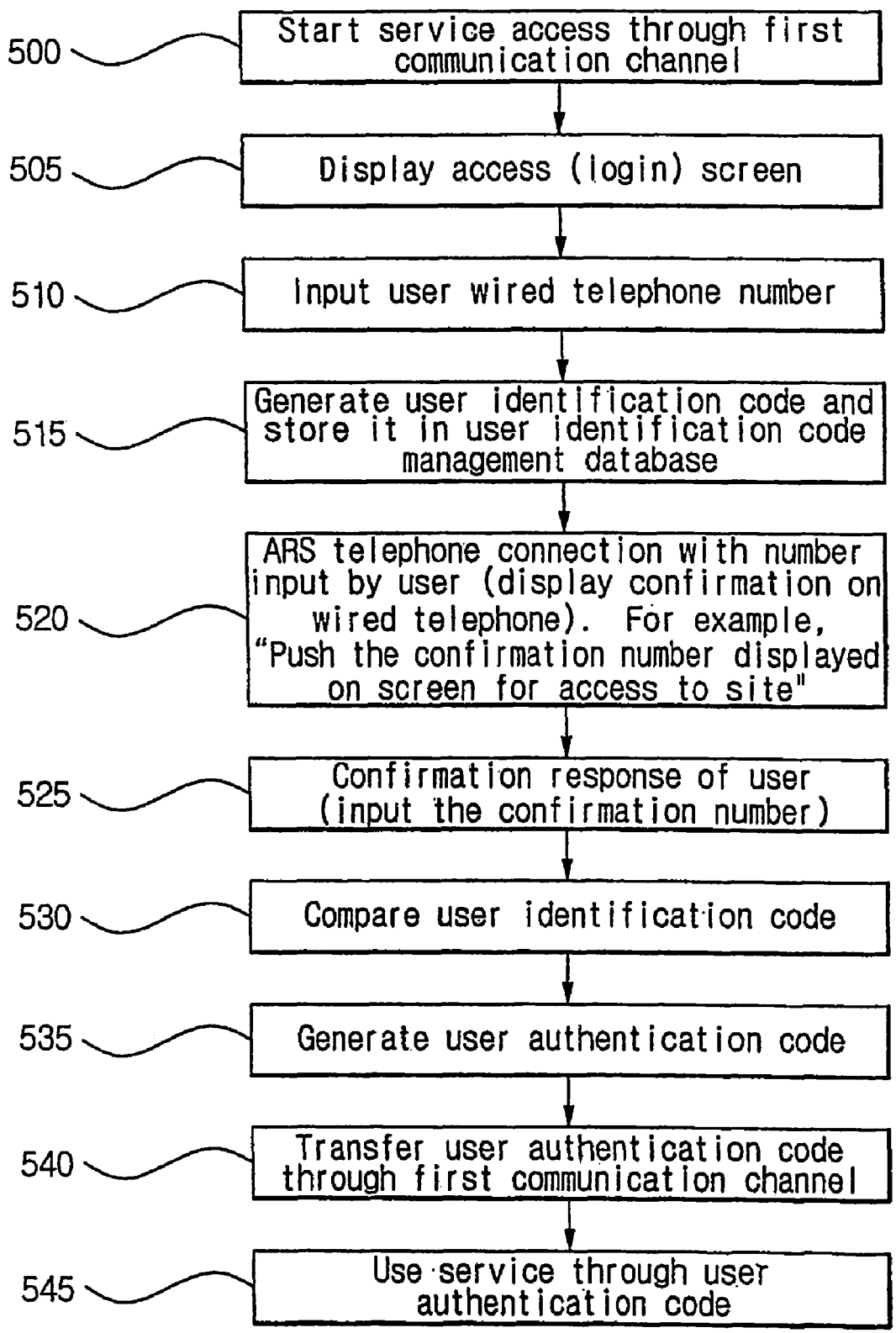
FIG. 5 is a flowchart showing an embodiment in a case that the second communication channel is a wired telephone network in the instant login user authentication by using the two different communication channels according to the present invention.

FIG. 5 is a flowchart for explaining a detailed embodiment in a case that the second communication channel is a wired telephone network in the user authentication method and system described in FIG. 2. As described above, the user accesses a system of the service provider through a first communication channel such as an Internet (step 500). The service provider transfers a service access screen to a first terminal of the user such as a computer upon a request of access from the user, and then displays the access (login) screen at a web browser worked in the first terminal of the user (step 505). The user inputs his/her wired telephone number for user authentication into a corresponding section of the login screen for transferring the telephone number to the service provider (step 510). Then, the service provider generates a user identification code for the user and stores the generated user identification code in a user identification code management database (step 515). The case of the second communication channel as the wired telephone network is somewhat different in a system for transferring the generated user identification code from the case of the second communication channel as the aforementioned wireless network. The service provider requests an establishment of a call with the wired telephone of the user and requests the user to input user identification information through an ARS (Automatic Response System) when the user receives the call (step 520). In this case, the user identification code to be input by the user through the wired telephone can be displayed on a web page through the first communication channel, and the user can confirm the displayed user identification code and input it through the wired telephone in the form of user confirmation response to the ARS (step 520). The service provider compares the user identification code input through the wired telephone with the user identification code displayed through the web page, determines the user as a lawful user when both user identification codes are identical to each other (step 530) and accordingly generates a user authentication code (step 535). The generated user authentication code is transferred to the first terminal of the user such as the computer through the first communication channel such as the Internet (step 540) and the user can use the service while giving/taking the user authentication code to/from the service provider (step 265 and 270), similar to FIGS. 3 and 4.

According to still another embodiment of the present invention, the service provider to perform the user authentication process searches a user information DB corresponding to the wired telephone number in association with a wired telephone carrier (Korean Telecommunications Company, Dacom Company, etc) through an ARS, send out a message "Input the last 7 units of the social security number of Esq.", determines the user as a lawful user if the information input from the user is correct, and accordingly generates a user authentication code. In this embodiment, the last 7 units of the social security number of the user can be considered to function as the user identification code in other aforementioned embodiments. The use of the service using the user authentication code generated by the above process is the same as in the embodiment for the aforementioned wireless network.

In the user authentication method according to the present invention, information use fee for a certain offered service can be imposed on the user. If the information use fee is imposed based on a time taken from the user authentication (user login) to a user log-out, the taken time can be utilized as a bill material. The information use fee can be imposed with an inclusion in a second communication channel use fee. Also, if the information use fee is imposed based on provision of specific services, the information use fee for the specific services can be settled as will be described below.

Figure 6A:
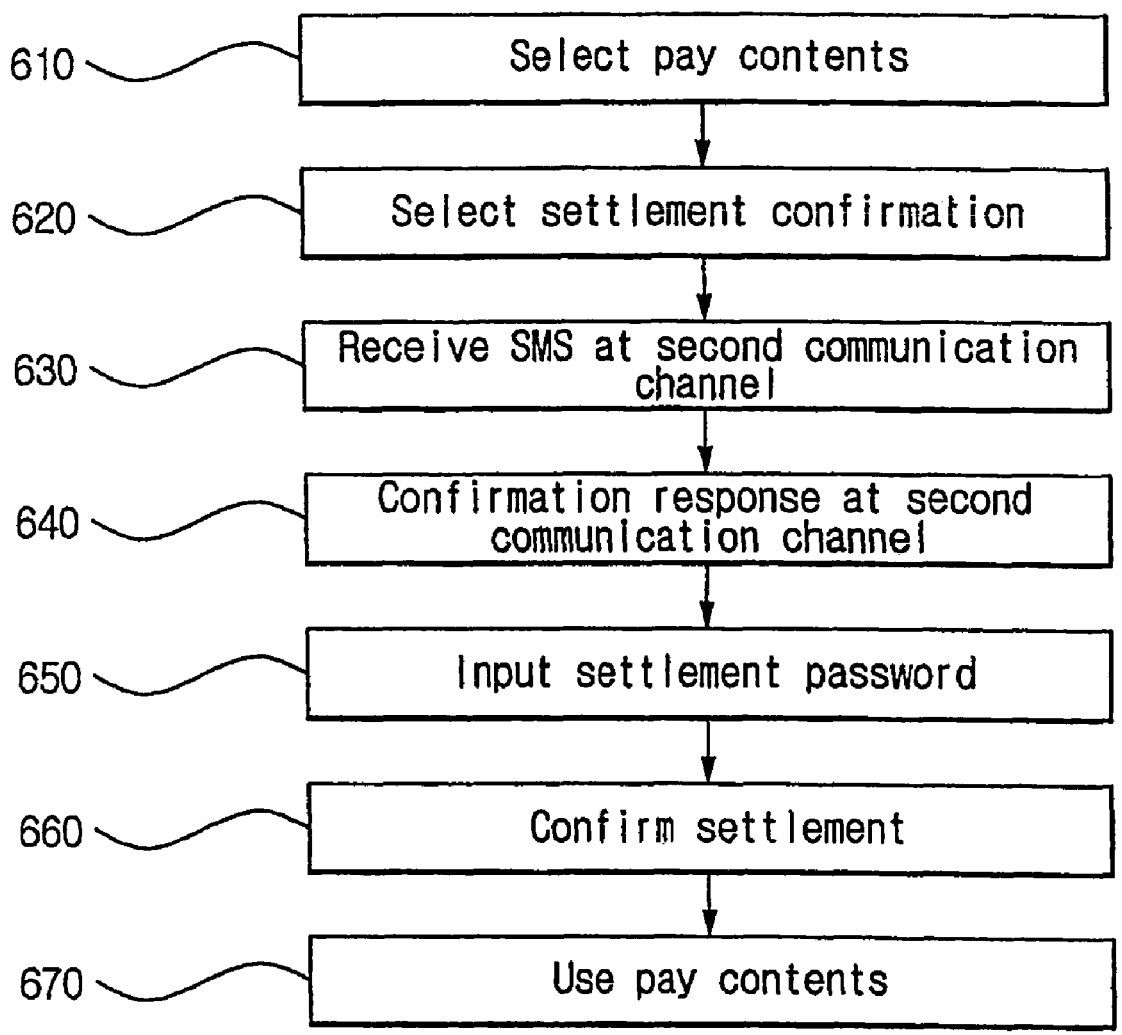
FIG. 6 is a flowchart showing a embodiment of a instant login method for settling bills authentication by using the two different communication channels and a drawing showing a example of service performing the flowchart.

FIG. 6A is a flowchart for explaining a method of settling the use fee for certain information use by using the two different communication channels according to a preferred embodiment of the present invention.

The method of settling the use fee by using the two different communication channels according to a preferred embodiment of the present invention is performed through the following steps. If a user selects pay contents to be paid for use of the contents (step 610), a system of a service provider can display a certain pop-up window for confirming a content of the selection on a terminal of a first communication channel such as a computer. When the user confirms the content of the displayed pop-up window and selects a use fee settlement (step 620), the system of the service provider transfers the SMS message through the terminal (mobile communication terminal) telephone number of the second communication channel of the user received for the instant login user authentication according to the present invention and the user receives the SMS message through the terminal of the second communication channel (step 630). The SMS message received for a settlement confirmation can further include a prescribed identification symbol for allowing the user to discriminate a message along with a message for the settlement confirmation. This identification symbol can be a numerical form used widely in the art, alternatively, a graphic image or a special character including an icon character according to the preferred embodiment of the present invention.

The user received the SMS message confirms that the identification symbol included in the SMS message is identical to that displayed on a display of the terminal of the second communication channel, and transfers the user confirmation response to the server specified in the URL callback for confirmation of use fee settlement by pushing the confirmation button of the terminal of the second communication channel if he/she agrees to settle the use fee (step 640). A series of identification code transferring/receiving steps and confirmation step by the user can be performed in same way as in the user authentication method described in FIGS. 3 and 4. In addition, according to the preferred embodiment of the present invention, a step of inputting a pre-stored password for settlement (step 650) can be further included in addition to the user confirmation response. The step 650 can play a great role in strengthening a security for settlement if the user loses the terminal of the second communication channel. When the confirmation response of the user is ended, the confirmation response is again transferred to the system of the service provider for settlement confirmation (step 660). After the settlement is confirmed, a pop-up window for notifying the settlement confirmation is displayed on the terminal of the first communication channel of the user and the user can use the pay contents (step 670). In the settlement method according to the preferred embodiment of the present invention described above, although the settlement method is described to be performed in association with the instant login user authentication method according to the present invention, it will be apparent to those skilled in the art that the settlement method according to the present invention can be implemented independent of the instant login user authentication method according to the present invention. In this case, a step of inputting a terminal identification number (such as a telephone number) of the second communication channel of the user can be further included for settlement.

Figure 6B:
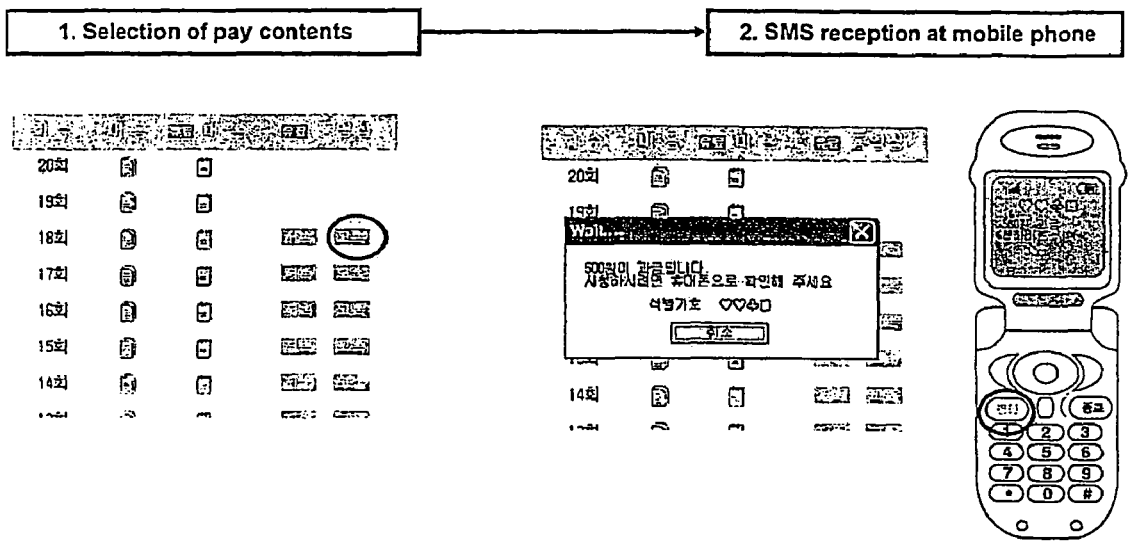
Figure 6C:
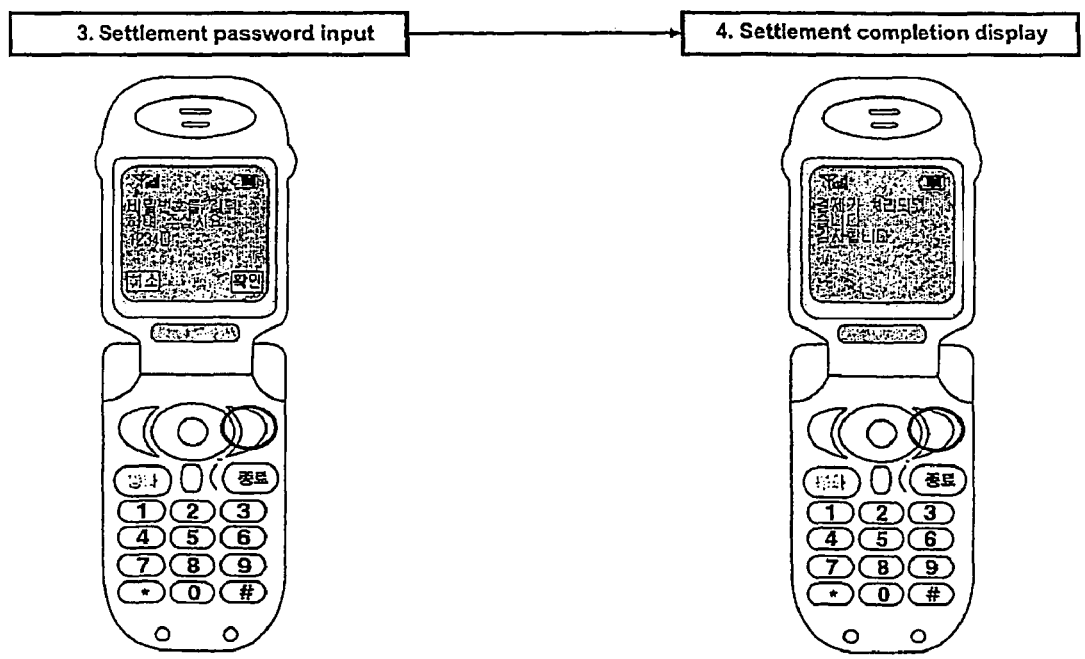
Figure 6D:
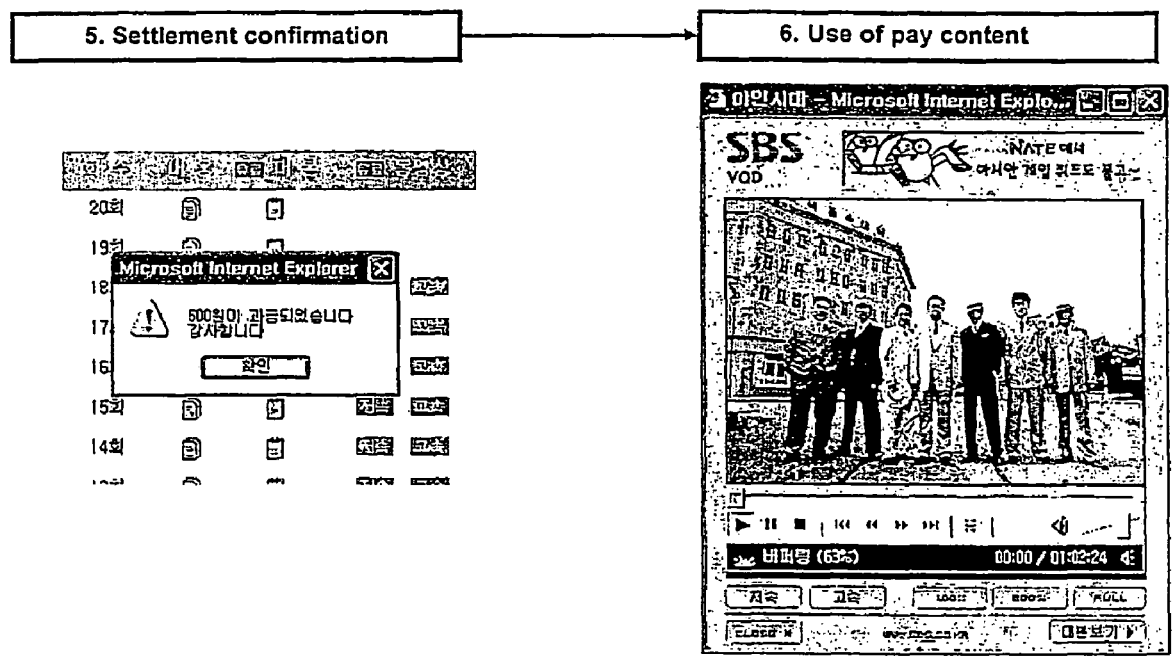

FIGS. 6B to 6D are view showing an example of the use fee settlement method for the pay contents according to the preferred embodiment of the present invention described above with reference to FIG. 6A. Referring to 6B, when the user selects the pay contents, a pop-up window for bill confirmation is displayed on the terminal of the first communication channel of the user and the SMS message is transferred to the terminal of the second communication channel of the user such as the mobile phone used for information input in the instant login user authentication process according to the embodiment of the present invention. According to a preferred embodiment of the present invention. The SMS message transferred to the terminal of the second communication channel of the user can further include a prescribed identification symbol for allowing the user to discriminate a message. This identification symbol can be a numerical form used widely in the art, alternatively, a graphic image or a special character including an icon character. FIG. 6C shows a process of inputting a pre-stored password into the terminal of the second communication channel of the user in order to determine whether the user occupying the terminal of the second communication channel such as the mobile phone at the time of settlement is a lawful user or not. It will be apparent to those skilled in the art that this password input process is not a process essential for the settlement according to the present invention, but can be omitted in implementation. FIG. 6D shows an example of using the pay contents when the pop-up window and settlement displayed on the terminal of the first communication channel of the user after the user conducts the confirmation response on the terminal of the second communication channel is ended. It will be apparent to those skilled in the art that the pop-up window displayed through the terminal of the first communication channel of the user shown in the embodiment of the settlement process according to the present invention illustrated in FIGS. 6B to 6D is only illustrated by way of example, and is not limitative in the settlement method according to the present invention.

Figure 7:
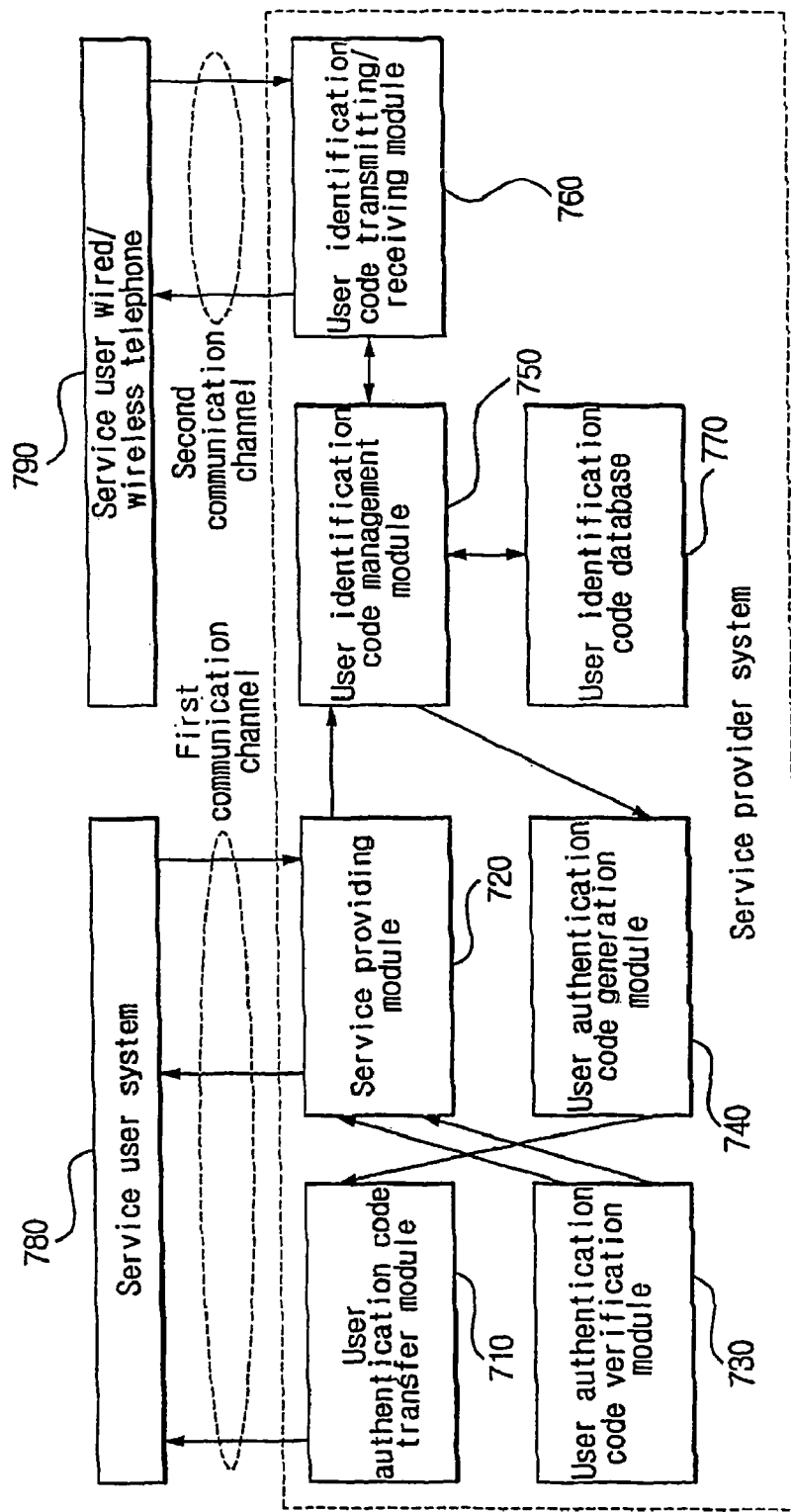
FIG. 7 is a block diagram showing a embodiment of a user and settlement system authentication by using the two different communication channels according to the present invention.

FIG. 7 shows a block diagram of a user authentication and settlement system for performing the aforementioned user authentication method. The user authentication and settlement system according to the present invention is generally divided into three parts, that is, a service provider system, a service user system 780 such as a computer, and a terminal 790 of a second communication channel of the service user. First, the service user system (for example, a computer) accesses the service provider system. A service providing module 720 of the service provider system receives a terminal number of the second communication channel of the user input from the service user system and transfers the received terminal number to a user identification code management module 750.

The user identification code management module 750 plays a role in generating and managing a user identification code for the user and can include a user identification code database for storing and managing the generated user identification code for each user.

The user identification code management module 750 transfers the generated user identification code to the terminal 790 (a wired telephone or a mobile communication terminal) of the second communication channel of the user through a user identification code transmitting/receiving module 760 and receives a user confirmation response from the terminal 790 of the second communication channel of the user. The user identification code transferred along with the user confirmation response through the terminal 790 of the second communication channel of the user is applied to the user identification code management module 750 through the user identification code transmitting/receiving module 760, a controller (not shown) included in the user identification code management module 750 compares the user identification code transferred to the terminal 790 of the second communication channel of the user with the user identification code received from the terminal 790 of the second communication channel of the user in order to determine whether both user identification codes match with each other. If both codes match with each other, such a match is notified to a user authentication code generation module 740 which in turn generates a user authentication code. The user authentication code generated in the user authentication code generation module 740 is transferred to a user authentication code transfer module 710 which in turn transfers the user authentication code to the service user system 780 through the first communication channel. The service user system 780 can use a certain service through the service providing module 720 of the service provider system by using the received user authentication code and validity for the user authentication code transferred to the service provider system can be verified in a user authentication code verification module 730 for use of service. In addition, according to an embodiment of the present invention, the user authentication code generation module 740 plays a role in transferring the generated authentication code, the information on -the user, and the settlement information including settlement price, settlement means information, etc., to a billing system (not shown). The billing system can be a system of a corresponding mobile communication company in the case of a settlement by a mobile phone or a system of a credit card company in the case of a settlement by a credit card. The billing system operates to receive the settlement information from the user authentication code generation module 740 and impose specific service fees on the service user.

Although an instant login user authentication and settlement method and system using two different communication channels according to the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

According to an instant login user authentication method and system using two different communication channels according to the present invention, since a user identification and authentication can be performed through a terminal of a second communication channel of a user in order to use a variety of services provided by a great number of different web sites, private information can be securely protected and a service use process become simple in that a registration process of the private information which has been required in a conventional method is removed.

In addition, according to an instant login user authentication method and system using two different communication channels according to the present invention, since a terminal address or number of a second communication of a user can be use as a user ID for use of a variety of services provided by a great number of different web sites, a possibility of lose or confusion of a user ID or password which could been caused by use of a number of user ID and passwords as in a conventional method and system can be substantially lowered. In addition to these advantages, since a service provider does not need a reply system and a more man power in preparation for lose of the user ID or password, an operation cost and complexity of service can be remarkably reduced over the prior art.

Further, according to an instant login user authentication method and system using two different communication channels according to the present invention, since a user identification is possible every login by a user for use of a variety of services provided by a great number of different web sites, a possibility of illegal use through counterfeit private information can be substantially lowered.

Furthermore, according to an instant login user authentication method and system using two different communication channels according to the present invention, since a service provision is performed through a first communication channel (Internet) which is capable of providing a variety of multi-media contents and a user identification and authentication is performed through a second communication channel with a relative strong security over the Internet, it is difficult to use illegally authentication data while monitoring two different communication channels simultaneously.

Moreover, according to a method and system of settling bills for use of contents using two different communication channels according to the present invention, since a terminal telephone number of a second communication channel of a user input at the time of an instant login according to the present invention is used as it is, new settlement information is not required, also since a new web page for inputting settlement information is not intervened in using the pay contents, reluctance of a user to use the pay contents can be minimized.

Finally, according to a method and system of settling bills for use of contents using two different communication channels according to the present invention, since a user has only to perform a confirmation response in a bill settlement process, a user is more and more convenient over a conventional settlement process.

Although the present invention has been illustrated and described with reference to the exemplified embodiments and the drawings, the present invention is not limited thereto. It will be apparent that those skilled in the art to which the present invention pertains can make various changes and modifications thereto. Therefore, the present invention should be construed only based on the appended claims and equivalents thereof will fall within the scope of the present invention.

The invention claimed is:

1. A method for authenticating a user who wants to use a certain service provided by a system of a service provider through a first communication channel, the system of the service provider performing the steps of:

receiving an access request from a first terminal of the user through the first communication channel;

receiving an address or number of a second terminal of the user through the first communication channel, wherein the second terminal is a mobile communication terminal;

transferring data for user identification to said second terminal through a second communication channel, said data for user identification including a user identification code generated by the system of the service provider and address data for enabling the second terminal to send the user identification code back to the system of the service provider, wherein the second communication channel is a wireless network and the user identification code is transferred back to the system of the service provider upon the user pressing a send button on the second terminal;

receiving the user identification code from the second terminal through the second communication channel, said user identification code having been transferred from the second terminal to the system of the service provider by using the address data;

determining whether the user identification code transferred to the second terminal is identical to the user identification code received from the second terminal;

generating a user authentication code if it is determined that both the user identification codes are identical to each other; and transferring the user authentication code from the system of the service provider to the first terminal through the first communication channel, wherein:

the address data include a callback number or callback uniform resource locator (URL) of a system for user identification, and the data for user identification further include a prescribed identification symbol comprising a numeral, graphic image, or a special character such as an icon character, and the method further comprises the steps of:

transferring the identification symbol to the first terminal through the first communication channel and controlling the identification symbol to be displayed on the first terminal;

controlling the identification symbol to be displayed on the second terminal; and allowing the user to determine whether the identification symbol displayed on the first terminal is identical to the identification symbol displayed on the second terminal and receiving a user confirmation response from the user accordingly.

2. The method as claimed in claim 1, further comprising the step of storing the user identification code in a database means according to each user.

3. A method for performing a settlement for a certain service provided by a system of a service provider through a first communication channel, the system of the service provider performing the steps of:

receiving an address or number of a second terminal of the user from a first terminal of the user through the first communication channel, wherein the second terminal is a mobile communication terminal;

transferring data for user identification to the system of the service provider through a second communication channel, said data for user identification including a user identification code generated by the system of the service provider and address data for enabling the second terminal to send the user identification code back to the system of the service provider, wherein the second communication channel is a wireless network and the user identification code is included in a user confirmation response and transferred back to the system of the service provider upon the user pressing a send button on the second terminal;

receiving user confirmation response, including the user identification code, from the second terminal through the second communication channel, the second terminal transferring the user confirmation response to the system of the service provider by using the address data;

determining whether the user identification code transferred to the second terminal is identical to the user identification code included in the user confirmation code received from the second terminal; and if it is determined that both the user identification codes are identical to each other, generating settlement information on the user and transferring the generated settlement information from the system of the service provider to a predetermined billing system, wherein:

the address data include a callback number or callback uniform resource locator (URL) of a system for settlement, the data for user identification further include a prescribed identification symbol comprising a numeral, graphic image, or a special character such as an icon character, and the method further comprises the steps of:

transferring the identification symbol to the first terminal through the first communication channel and controlling the identification symbol to be displayed on the first terminal;

controlling the identification symbol to be displayed on the second terminal; and allowing the user to determine whether the identification symbol displayed on the first terminal is identical to the identification symbol displayed on the second terminal and receiving a user confirmation response from the user accordingly.

4. The method as claimed in claim 3, further comprising the step of causing the user to input a predetermined password into the second terminal.

* * * * *